Oct. 15, 1940.                G. H. PADRICK                2,217,809
                           COTTON STALK HARVESTER
                           Filed April 18, 1939          2 Sheets-Sheet 1
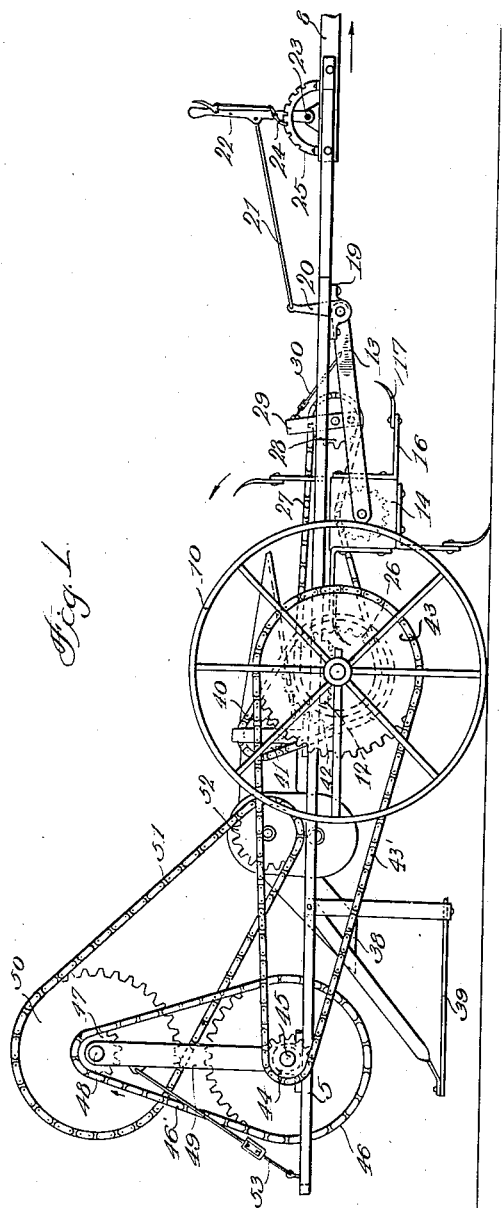
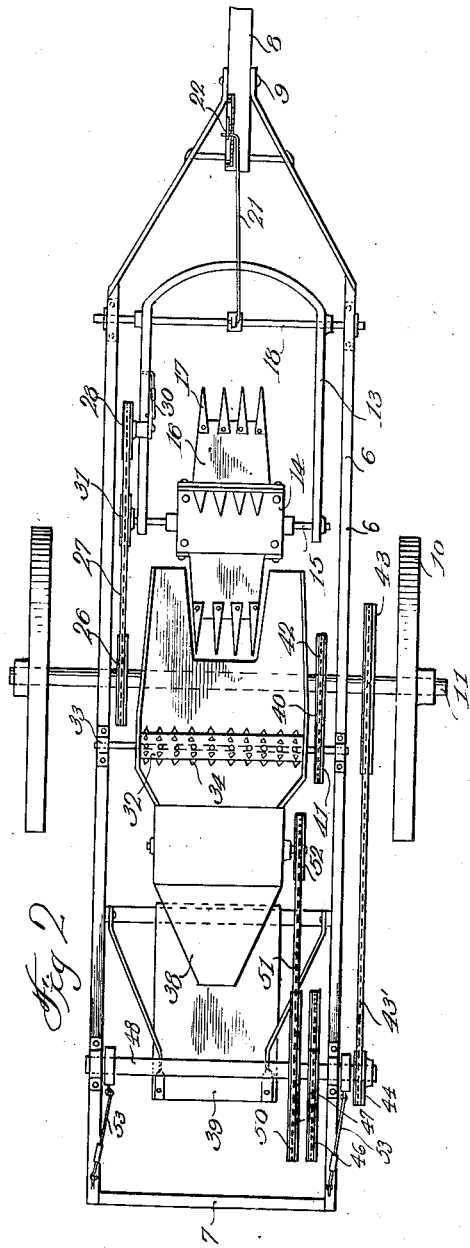
Inventor
George H. Padrick
By Ralph Burch
Attorney

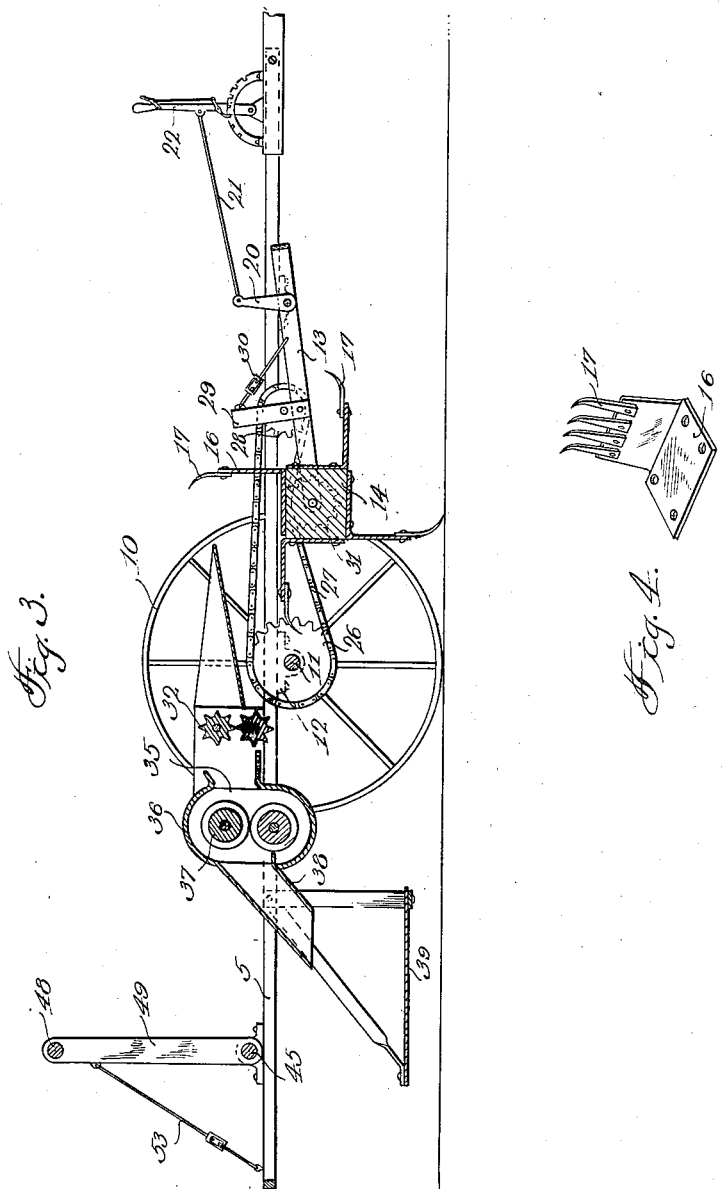
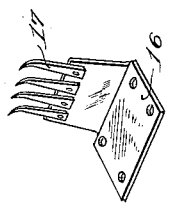

Patented Oct. 15, 1940

2,217,809

UNITED STATES PATENT OFFICE 2,217,809

COTTON STALK HARVESTER

George H. Padrick, Lakeland, Fla.

Application April 13, 1939, Serial No. 268,561

1 Claim. (Cl. 55—66)

This invention relates to cotton stalk harvester machines and has for its object to provide a machine provided with a puller for extracting the cotton stalks from the ground and a grinder for reducing the stalks to pulp for use in the manufacture of paper.

A further object of the invention resides in providing a machine of the above-mentioned character which is simple and durable in construction, reliable and efficient in operation and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation of the machine, Fig. 2 is a top plan view of the same, Fig. 3 is a longitudinal sectional view, and, Fig. 4 is a perspective view of one of the blades of the stalk puller.

In the drawings, wherein for the purpose of illustration, I have shown a preferred embodiment of my invention, the numeral 5 denotes the frame of the machine composed of longitudinal side bars 6 connected at one end by a cross bar 7 and having their opposite ends converging forwardly and connected to a tongue 8, as at 9. The frame is supported, intermediate its length, by a pair of traction wheels 10 fixedly mounted on an axle 11 extending transversely of the frame and journaled in bearings 12 attached to the side bars. The wheels may be adjusted on the axle to straddle various width rows of cotton stalks.

An auxiliary U-shaped frame 13 is adjustably mounted on the forward end of the frame 5 for supporting the stalk puller 14. The free ends of the frame 13 support a shaft 15 on which the puller 14 is fixedly mounted to turn therewith. The body of the puller is square in cross section and attached to each side of the body is an angular blade 16 having spaced wedge shaped spring fingers 17 attached to the free edge thereof which are slightly curved longitudinally. The opposite end of the frame 13 is attached to the transverse rod 18 journaled in the bearings 19 attached to the side bars 6 of the frame 5. The rod 18 intermediate its length has an upstanding arm 20 connected by a rod 21 to the hand lever 22 pivotally mounted at 23 on the tongue 8, whereby the frame 13 is adjusted to raise or lower the puller with respect to the ground over which the machine is traveling. The hand lever 22 is provided with a pawl 24 for engagement with notches in the quadrant 25 to retain the hand lever in its adjusted position. A drive sprocket wheel 26 is mounted on the axle 11 and is connected by an endless chain 27 with the pinion wheel 28 mounted on the arm 29 pivotally attached to the frame 13 and a turn-buckle rod 30 extending between the arm 29 and frame 13 serves to adjust the arm 29 to tighten the chain 27. The lower side of the chain 27 passes over the pinion wheel 31 on the end of the shaft 15 thereby imparting rotary motion to the puller in a reverse direction to that of the wheels 10.

A stripping roller 32 is mounted on the frame 5 directly in the path of movement of the stalks carried by the puller being mounted in brackets 33 attached to the side bars 6. The stripping roller 32 is provided with a plurality of teeth or spikes 34 for gripping the stalks and removing them from the teeth of the puller. The stripping rollers are disposed adjacent the mouth 35 of the grinder 36 to which the stalks are delivered, passing between the crushing rollers 37 which reduces them to pulp. The pulp is delivered from the grinder by the chute 38 to the sacking platform 39.

The stripping rollers 32 are driven by an endless chain 40 connecting the sprocket 41 on the end of the roller shaft with the sprocket 42 on the axle 11. The crushing rollers 37 of the grinder are driven by a chain of gearing consisting of a drive sprocket 43 mounted on the axle 11 connected by an endless chain 43' with a smaller sprocket 44 mounted on a shaft 45 which carries a larger sprocket 46 and the sprocket 46 is connected through an endless chain 46' with a smaller sprocket 47 mounted on the shaft 48 supported above the shaft 45 by uprights 49 and a larger gear 50 mounted on the shaft 48 is connected by an endless chain 51 with the smaller sprocket 52 on the end of the shaft of the crushing roller. The uprights 49 are pivotally connected to the shaft 45 and are connected through turn-buckle rods 53 with the frame 5 to permit tightening of the chain 51.

In operation, the machine may be drawn by a tractor or horses along the rows of cotton stalks so that the stalks are in the path of movement of the puller 14. As the wheels 10 of the machine turn motion is transmitted to the puller 14, stripping rollers 32 and crushing rollers 37. As the spring fingers 17 of the puller 14 engage the cotton stalks, the stalks are wedged between the teeth and lifted from the ground. As the puller revolves carrying the stalks in the fingers, the stalks are removed by the stripping rollers 32 which direct the stalks into the grinder 36 where the crushing rollers 37 reduce the stalks to a pulp which is discharged through the chute 38 onto the sacking platform 39.

It is to be understood that the form of my invention herein shown and described is to be taken as a preferred example of the same and that certain changes in the shape, size and arrangement of the parts may be made without departing from the spirit of the invention or the scope of the subjoined claim.

Having thus described my invention, I claim:

A cotton stalk harvester machine comprising a frame, traction wheels supporting said frame, an auxiliary frame pivotally mounted at the forward end of said main frame, means for raising or lowering said auxiliary frame, a rotatable puller mounted in said auxiliary frame having spring teeth extending therefrom, stripping rollers mounted on said main frame adjacent said puller, crushing rollers adjacent said stripping rollers and driving means connecting said puller, stripping rollers and crushing rollers with said traction wheels.

GEORGE H. PADRICK.